United States Patent [19]

Wilcox et al.

[11] Patent Number: 5,372,211
[45] Date of Patent: Dec. 13, 1994

[54] METHOD FOR SURMOUNTING AN OBSTACLE BY A ROBOT VEHICLE

[75] Inventors: Brian H. Wilcox, La Canada; Timothy R. Ohm, La Crescenta, both of Calif.

[73] Assignee: The United States of America as represented by the Administrator of the National Aeronautics and Space Administration, Washington, D.C.

[21] Appl. No.: 956,684

[22] Filed: Oct. 1, 1992

[51] Int. Cl.⁵ .......................................... B62D 57/024
[52] U.S. Cl. ...................................... 180/8.2; 180/8.3; 280/5.28
[58] Field of Search .......................... 180/8.2, 8.3, 8.5; 280/5.2, 5.28, 5.32, DIG. 10; 901/1

[56] References Cited

U.S. PATENT DOCUMENTS

| | | | |
|---|---|---|---|
| 1,785,646 | 12/1930 | Pascoo | 280/5.28 |
| 3,730,287 | 5/1973 | Fletcher | 180/6.5 |
| 4,119,163 | 10/1978 | Ball | 180/6.5 |
| 4,265,326 | 5/1981 | Lauber | 180/8.3 |
| 4,566,707 | 1/1986 | Nitzberg | 280/DIG. 10 |
| 4,750,751 | 6/1988 | Schafer | 180/41 |
| 4,932,831 | 6/1990 | White et al. | 414/732 |
| 4,977,971 | 12/1990 | Crane, III et al. | 180/8.3 |

FOREIGN PATENT DOCUMENTS

| | | | |
|---|---|---|---|
| 0138071 | 10/1981 | Japan | 180/8.2 |
| 0176871 | 9/1985 | Japan | 901/1 |
| 0275486 | 11/1988 | Japan | 901/1 |
| 1078987 | 3/1989 | Japan | 901/1 |
| 003577 | 1/1990 | Japan | 180/8.2 |
| 0003578 | 1/1990 | Japan | 180/8.2 |

*Primary Examiner*—Karin L. Tyson
*Assistant Examiner*—Anne Marie Boehler
*Attorney, Agent, or Firm*—John H. Kusmiss; Thomas H. Jones; Guy M. Miller

[57] ABSTRACT

Surmounting obstacles in the path of a robot vehicle is accomplished by rotating the wheel forks of the vehicle about their transverse axes with respect to the vehicle body so as to shift most of the vehicle weight onto the rear wheels, and then driving the vehicle forward so as to drive the now lightly-loaded front wheels (only) over the obstacle. Then, after the front wheels have either surmounted or completely passed the obstacle (depending upon the length of the obstacle), the forks are again rotated about their transverse axes so as to shift most of the vehicle weight onto the front wheels. Then the vehicle is again driven forward so as to drive the now lightly-loaded rear wheels over the obstacle. Once the obstacle has been completely cleared and the vehicle is again on relatively level terrain, the forks are again rotated so as to uniformly distribute the vehicle weight between the front and rear wheels.

3 Claims, 4 Drawing Sheets

METHOD FOR SURMOUNTING AN OBSTACLE BY A ROBOT VEHICLE

BACKGROUND OF THE INVENTION

1. Origin of the Invention

The invention described herein was made in the performance of work under a NASA contract, and is subject to the provisions of Public Law 96-517 (35 USC 202) in which the Contractor has elected not to retain title.

2. Technical Field

The invention relates to mobile robot vehicles and in particular to miniature unmanned robot vehicles for use in exploring rough terrains such as planetary surfaces and more specifically to a method of operating such a vehicle for surmounting obstacles in the vehicle's path.

Background of the Invention

Various types of robot vehicles useful for exploring rough terrain such as planetary surfaces are known in the art. Of particular interest to the present invention is the type of robot vehicle disclosed in U.S. Pat. No. 3,730,287 supported on two pairs of wheels connected to the vehicle body by respective struts, the front struts and the rear struts being independently rotatable about respective forward and rear axes intersecting the vehicle body and transverse to the direction of vehicle travel.

A critical problem in the operation of any robot vehicle in extremely rough terrain is how to climb or surmount obstacles in the vehicle's path. The technique illustrated in U.S. Pat. No. 3,730,287 referenced above essentially is a crawl technique in which the forward struts reach out one-by-one at an obstacle to scale the obstacle by crawling over it, involving a fairly complex robotic control algorithm.

SUMMARY OF THE INVENTION

The present invention is a new method for surmounting obstacles in the path of a robot vehicle of the general type disclosed in the above-referenced patent. The method of the invention is to rotate the forks about their transverse axes with respect to the vehicle body so as to shift most of the vehicle weight onto the rear wheels, and then drive the vehicle forward so as to drive the now lightly-loaded front wheels (only) over the obstacle. Then, after the front wheels have either surmounted or completely passed the obstacle (depending upon the length of the obstacle), the forks are again rotated about their transverse axes so as to shift most of the vehicle weight onto the front wheels. Then the vehicle is again driven forward so as to drive the now lightly-loaded rear wheels over the obstacle. Once the obstacle has been completely cleared and the vehicle is again on relatively level terrain, the forks are again rotated so as to uniformly distribute the vehicle weight between the front and rear wheels.

In a preferred embodiment of the invention, in the first shifting step of the method the weight is shifted to the rear wheels by rotating the front forks so as to shift the front wheels forward, while in the second shifting step of the method the weight is shifted to the front wheels by returning the front forks to their original angular position while rotating the rear forks so as to shift the rear wheels rearwardly.

A miniature robot vehicle called the Go-For robot vehicle has been built and successfully tested in accordance with the method of the present invention. The Go-For robot vehicle, which weighs about 4 kilograms, is 0.4 meters long, 0.3 meters wide and 0.3 meters wide. A four-wheeled, skid-steer vehicle, the Go-For robot vehicle employs a fork-wheeled mobility concept analogous to that disclosed in the above-referenced patent, in which its four wheels are configured such that the front two wheels and the rear two wheels are mounted on actively driven fork and strut mechanisms. This approach, which permits active articulation, allows the Go-For robot vehicle to surmount obstacles of height up to 60% of its length. The forks consist of individual struts ending down to the wheel hubs and connected through the body of the vehicle by torque-tubes. By making the struts almost as long as the distance between the torque-tubes, it is possible to rotate each of the torque-tubes entirely around freely, without interfering with the other in most positions.

While the invention is described in detail below with reference to the Go-For robot vehicle which is a miniature robot planetary rover, the invention is applicable to any type of vehicle, including toys vehicles or robot vehicles.

DETAILED DESCRIPTION OF THE INVENTION

Figure 1:
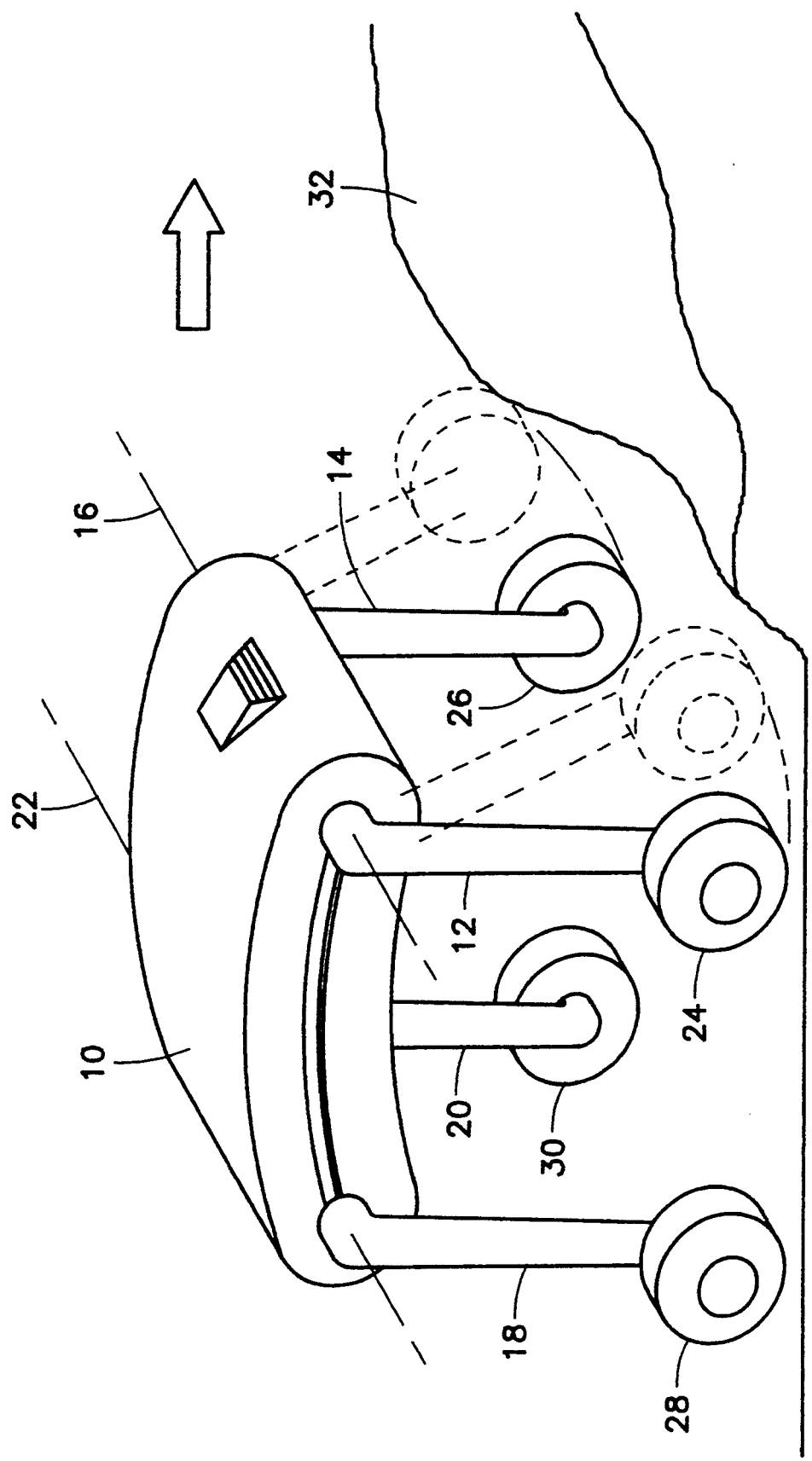
FIGS. 1, 2, 3 and 4 are sequential perspective views of the Go-For robot vehicle performing the method of the present invention in respective steps thereof.

Referring to FIG. 1, a miniature robot vehicle includes a body 10, right and left front forks 12, 14 rotatable about a front fork axis 16 and right and left rear forks 18, 20 rotatable about a rear fork axis 22. At the distal end of each fork 12, 14, 18, 20 is mounted wheel 24, 26, 28, 30, respectively. The body 10 of the robot vehicle contains robot control electronics and servomechanisms of the type well-known in the art but specifically adapted in accordance with the invention to permit rotation of the forks about their respective axes 16, 22. In addition, the wheels 24, 26, 28, 30 are powered by electric motors and transmission devices inside the vehicle to drive the vehicle forward.

Figure 2:
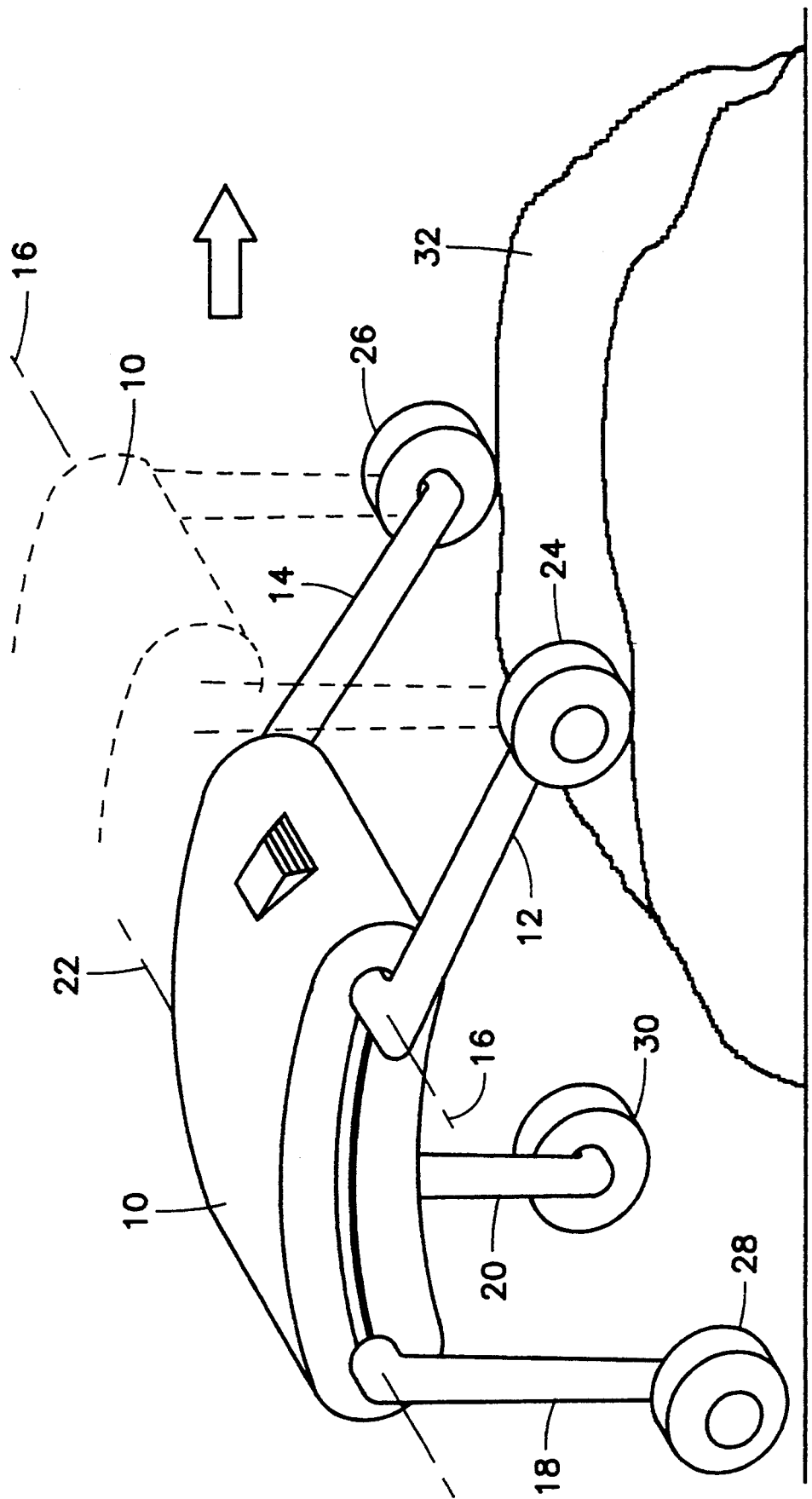
Figure 3:
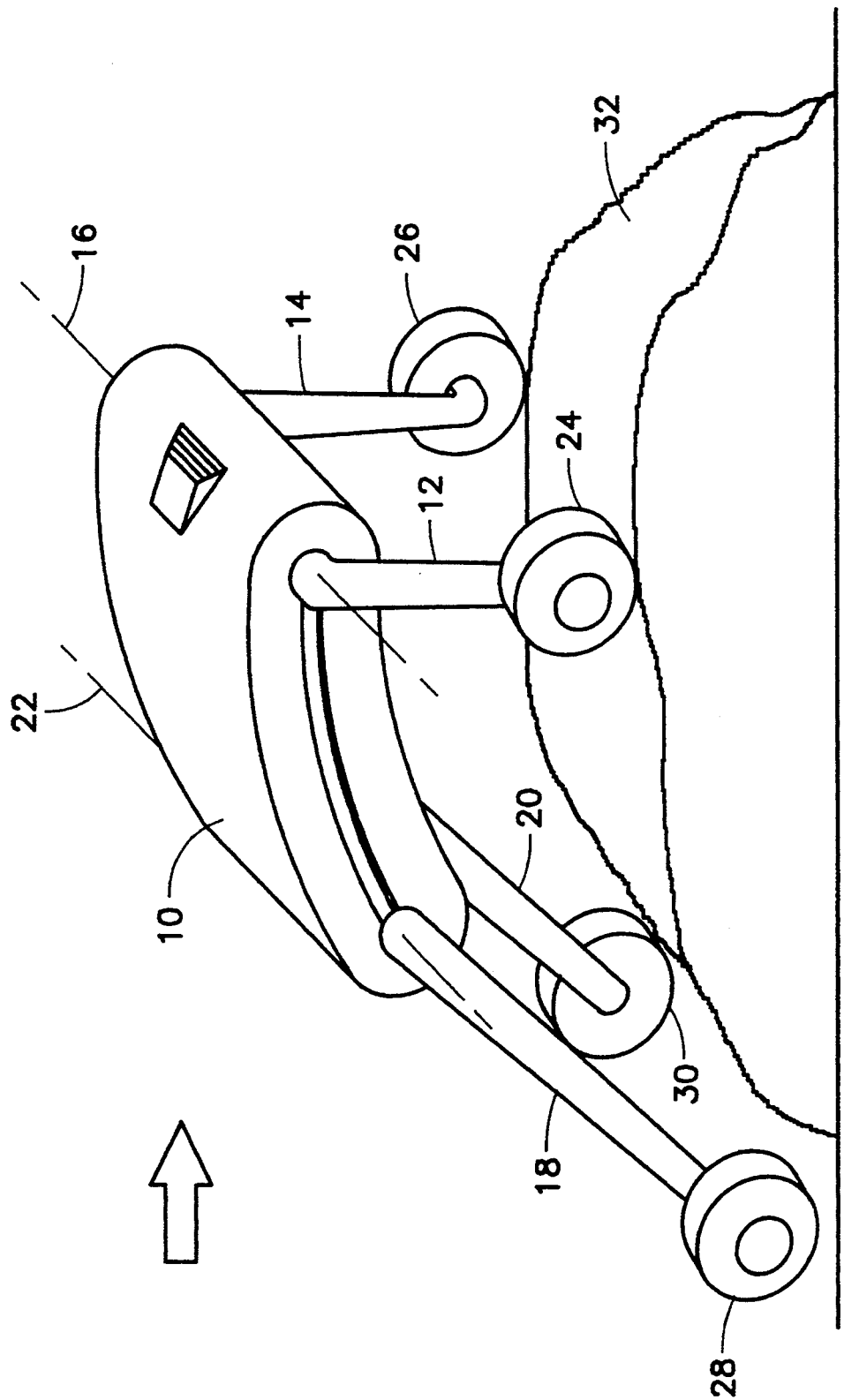
Figure 4:
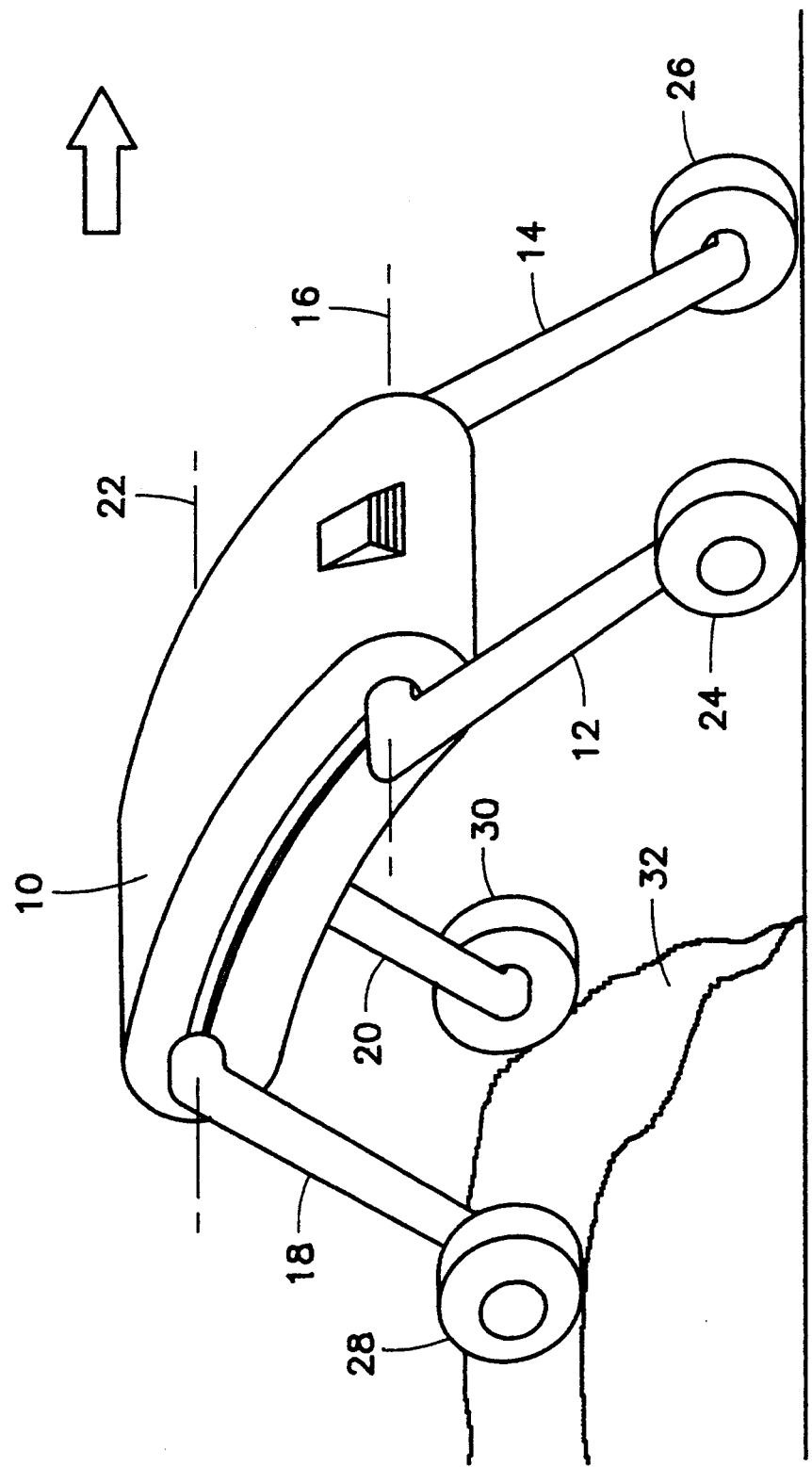

As indicated in FIG. 1, whenever an obstacle 32 is encountered, the front forks 12, 14 are rotated about the front fork axis 16 so as the thrust the front wheels 24, 26 forwardly, thereby shifting the majority of vehicle weight onto the rear wheels 28, 30. Then, the vehicle is driven forward toward the obstacle 32 so as to drive the front wheels 12, 14 over the obstacle 32 as shown in FIG. 2. Thereafter, as indicated in dashed line in FIG. 2, the front forks 12, 14 are rotated back to their original positions with respect to the vehicle body 10 to achieve the configuration of FIG. 3. Then, as shown in FIG. 4, the vehicle is driven forward again to so bring the rear wheels 18, 20 over the obstacle 32. After the vehicle has cleared the top of the obstacle, the forks 12, 14, 18, 20 are returned to their original positions corresponding to the configuration of FIG. 1. In the example of FIG. 4, however, the front forks are thrust forward as shown to provide stability during descent.

While the invention has been described by specific reference to preferred embodiments thereof, it is understood that variations and modifications thereof may be made without departing from the true spirit and scope of the invention.

What is claimed is:

1. A method of operating a vehicle supported on front and rear wheels connected to the vehicle body by respective front and rear struts, the front struts and the rear struts being independently rotatable about respective forward and rear axes, wherein the axes intersect the vehicle body in a direction transverse to the direction of vehicle travel, said method comprising the steps of:
   rotating the front struts simultaneously about their transverse axis with respect to the vehicle body from an original angular position to move the front wheels forward so as to shift most of the vehicle weight onto the rear wheels;
   driving the vehicle forward by powered rotation of at least some of said wheels so as to drive the now lightly-loaded front wheels over an obstacle;
   returning the front forks to their original angular position while rotating the rear struts simultaneously about their transverse axis with respect to the vehicle body to move the rear wheels rearward so as to shift most of the vehicle weight onto the front wheels; and
   driving said vehicle forward by powered rotation of at least some of said wheels so as to drive the now lightly-loaded rear wheels over the obstacle.

2. The method of claim 1 further comprising, after the obstacle has been cleared and the vehicle is again on relatively level terrain, rotating the front and rear struts so as to uniformly distribute the vehicle weight between the front and rear wheels.

3. A method of operating a vehicle supported on front and rear wheels connected to the vehicle body by respective front and rear struts, the front struts and the rear struts being independently rotatable about respective forward and rear axes, wherein the axes intersect the vehicle body in a direction transverse to the direction of vehicle travel, said method comprising the steps of:
   rotating the front struts simultaneously about their transverse axis with respect to the vehicle body from an original angular position to move the front wheels forward so as to shift most of the vehicle weight onto the rear wheels;
   driving the vehicle forward by powered rotation of at least some of said wheels so as to drive the now lightly-loaded front wheels on top of an obstacle;
   returning the front forks to their original angular position while rotating the rear struts simultaneously about their transverse axis with respect to the vehicle body from an original angular position to move the rear wheels rearward so as to shift most of the vehicle weight onto the front wheels;
   driving said vehicle forward by powered rotation of at least some of said wheels so as to drive the now lightly-loaded rear wheels on top of the obstacle;
   returning the rear forks to their original angular position while rotating the front struts simultaneously about their transverse axis with respect to the vehicle body to move the front wheels forward to provide stability during descent;
   driving the vehicle forward by powered rotation of at least some of said wheels until clear of the obstacle; and,
   rotating the front and rear struts so as to uniformly distribute the vehicle weight between the front and rear wheels once the vehicle is again on relatively level terrain.

* * * * *